United States Patent

Miller

[15] 3,641,584

[45] Feb. 8, 1972

[54] INCREMENTAL RECORDER WITH COMMON CONTROL OF DRIVE AND RECORDER

[72] Inventor: Wendell S. Miller, 1341 Comstock Ave., Los Angeles, Calif. 90024

[22] Filed: Aug. 4, 1969

[21] Appl. No.: 847,354

[52] U.S. Cl. ....................................346/74 M, 340/174.1 A

[51] Int. Cl. ....................................................G11b 15/20

[58] Field of Search............................340/174.1 A, 174.1 G; 179/100.2 MI; 346/74 M

[56] References Cited

UNITED STATES PATENTS

| | | | |
|---|---|---|---|
| 3,188,615 | 6/1965 | Wilcox, Jr. | 340/174.1 |
| 3,454,930 | 7/1969 | Schoeneman | 340/174.1 |
| 3,474,429 | 10/1969 | McCowen et al. | 340/174.1 |

*Primary Examiner*—Bernard Konick
*Assistant Examiner*—Vincent P. Canney
*Attorney*—William P. Green

[57] ABSTRACT

Apparatus for recording a series of data bits on a record track, and including a motor preferably operable by alternating current to advance the record track one step for each half cycle of the alternating current in either direction, and a recording head structure for recording data bits on the track during one of the half cycles of the alternating current but not during the reverse half cycle.

5 Claims, 6 Drawing Figures

WENDELL S. MILLER
INVENTOR.

BY William P. Green
ATTORNEY

WENDELL S. MILLER
INVENTOR.

BY William P. Green
ATTORNEY

INCREMENTAL RECORDER WITH COMMON CONTROL OF DRIVE AND RECORDER

BACKGROUND OF THE INVENTION

This invention relates to improved apparatus for recording data, such as a series of binary digits, on a record track.

Most prior equipment for recording digital date or the like on a record track, such as on a magnetic tape, has been very expensive and complex, in order to assure production of a recorded signal pattern which can be effectively and reliably read back from the record track at a subsequent time. Control of the duration of the recorded signals, in time and in distance along the record track, has required precise timing equipment, for regulating in proper relation the energizations of the recording head or its equivalent, and the advancement of the tape or other record track. These problems have been complicated in some respects in incremental-type recorders, in which it is desired to supply information intermittently to the apparatus, but usually to provide a continuous record track which can be played back without interruption on playback equipment.

SUMMARY OF THE INVENTION

A recorder constructed in accordance with the present invention is adapted to record a series of data bits in a manner utilizing an extremely simple circuitry and apparatus as compared with prior arrangements, at a consequent very low cost, but still in a manner providing a completely adequate record on which the various digital signals are readily distinguishable and readable. In addition, a record track formed by the present apparatus may if desired be produced in a manner such that it is self-clocking, that is, can be read back without provision of any special clocking signal or clocking track in association with the main series of recorded digits. The apparatus may function either for continuous recording, or as an incremental recorder operating only intermittently. These various features of the equipment, and other features to be discussed hereinbelow, in conjunction with the extremely simple and low-cost circuitry utilized, render possible employment of the present recorder for digital recording in many different situations in which such recording was heretofore economically unfeasible or impractical.

With regard to structure of the apparatus, I employ a recording head or heads which produce a timed record in unique manner by utilizing the alternations of an alternating current power source to time the signals recorded on the track. Preferably, the apparatus functions to record data signals only on one half cycle of the alternating current, while avoiding the recording of any such signals on the other half of the cycle. For example, data may be recorded on each positive half cycle of the alternating current, but with no information being recorded on the negative half cycles, and typically with the nonrecording periods or half cycles being utilized for clocking purposes on playback. To maintain substantially uniform the length or duration of different data cells on the record track, the motor which advances the tape or other track is preferably timed by the same alternating current which times the energizations of the recording head, and desirably in a manner advancing the tape through a predetermined distance or step on each half cycle of the current. A simple and inexpensive step-by-step vibratory motor may be employed for this purpose, with the tape advancing through one step during the recording of each data bit, and with the tape also advancing through one step between each pair of successive bits, to thereby produce the desired overall series of recorded data bits spaced short distances apart on the record track.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENT

Figure 1:
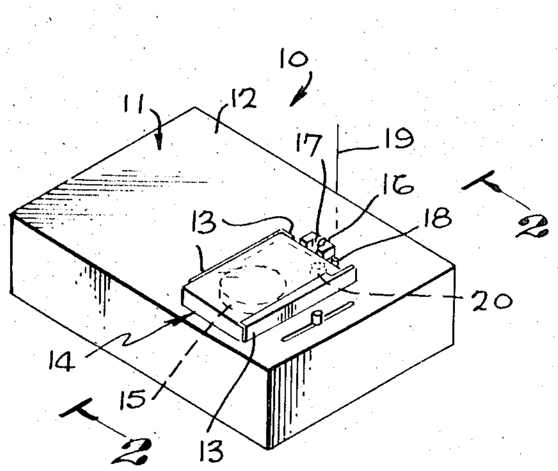
FIG. 1 is a perspective view showing a cartridge-type tape recorder constructed in accordance with the invention.

The recorder 10 of FIG. 1 includes a housing 11 having a top wall 12 on which three upstanding walls 13 form a guideway or recess into which a conventional tape cartridge 14 may be inserted to the recording position of FIG. 1. Cartridge 14 includes the usual rectangular case having an endless magnetic tape 15 contained therein, on which information is recorded magnetically by a conventional recording head 16 having a recording coil 17. When the cartridge is in the FIG. 1 position, it contacts a vertically extending drive shaft or capstan 18 turning about a vertical axis 19, with this capstan serving to advance the tape progressively past recording head 16 to record digital information on the tape. For coaction with vertical capstan or shaft 18, there is provided a conventional idler roller 20 formed of rubber or the like and mounted by a structure 21 to swing between the broken-line inactive position of FIG. 2, and the full-line active position of that figure in which it is yieldingly urged toward the capstan, to grip the tape between roller 20 and the capstan in a manner assuring positive drive of the tape. Roller 20 may be actuable between its two illustrated positions by a suitable control lever 22 accessible from the upper side of housing 11.

Figure 2:
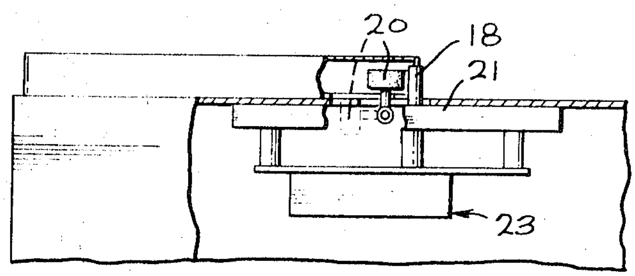
FIG. 2 is an enlarged fragmentary vertical section taken on line 2—2 of FIG. 1.
Figure 3:
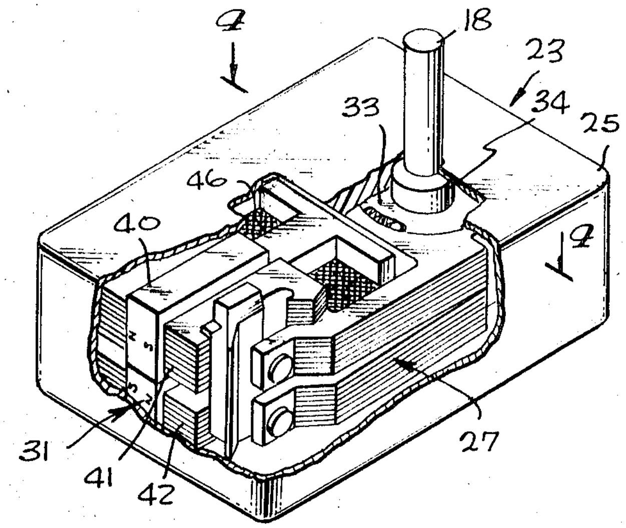
FIG. 3 is a perspective view of the step-by-step motor for driving the tape of FIG. 1, wit the housing of the motor broken away to reveal its interior.
Figures 4, 5, 6:
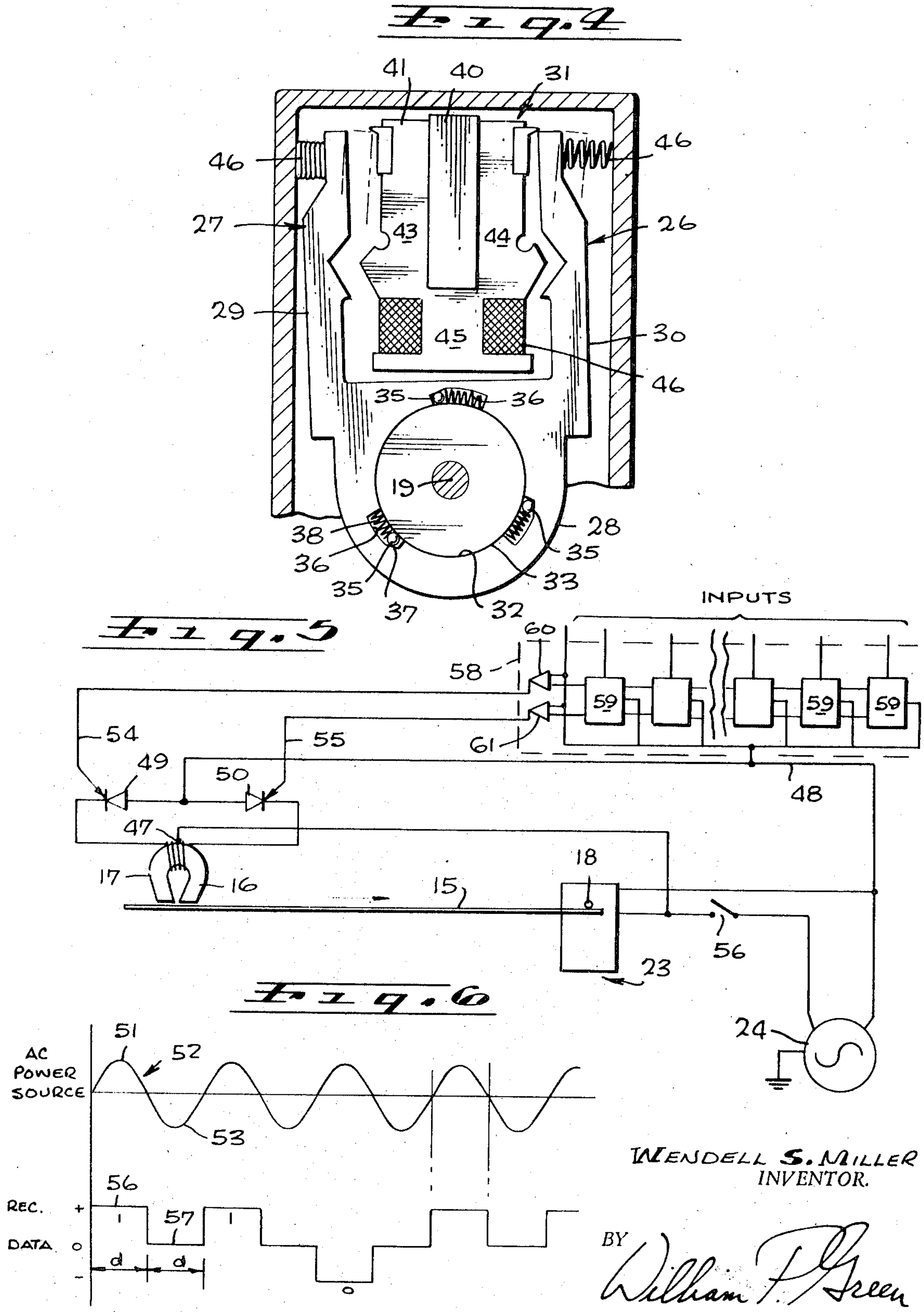
FIG. 4 is a section taken on line 4—4 of FIG. 3.
FIG. 5 illustrates the electrical circuit of the FIG. 1 recorder.
FIG. 6 shows the relationship between the wave of the alternating current power source and the waveform of the recorded data on the magnetic tape.

As seen in FIG. 2, the capstan or shaft 18 may be the driven shaft of a motor 23, which is preferably of a vibratory step-by-step type operating in timed relation to, and timed by, the alternations or changes in direction of current from an alternating current power source represented diagrammatically at 24 in FIG. 5. The preferred type of step-by-step motor typically illustrated in FIGS. 3 and 4 includes a rectangular housing 25 appropriately secured to the main housing 11 of the recorder, and containing two oppositely moving vibratory or oscillatory armature assemblies 26 and 27 for driving the shaft 18 alternately. FIG. 4 illustrates one of these oscillatory armature assemblies 26, as including a lower body portion 28, which carries two upstanding spaced arms 29 and 30 at opposite sides of a stationary magnetic pole assembly 31. The armature 26 is mounted for slight oscillatory rotary motion about axis 19 of shaft 18 by provision of a cylindrical recess or passage 32 in body 28 of the armature, with this circular or cylindrical portion rotatably receiving an enlarged externally cylindrical hub portion 33 of shaft 18. The shaft is of course appropriately journaled for rotation about axis 19, as by means of two bearings 34 one of which is seen in FIG. 3. Spring-pressed rollers 35 contained within circularly spaced notches or recesses 36 formed in body portion 28 of the armature act in known manner as one-way clutch elements for transmitting rotary motion from armature 26 to shaft 18 in one direction, but not in the reverse direction. More particularly, as seen in FIG. 4, the rollers are received within tapering radially reduced dimension portions 37 of the notches or recesses 36 to transmit rotation in a clockwise direction as seen in FIG. 4, but are displaceable sufficiently out of those reduced dimension portions of the notches, against the tendency of their associated springs 38, upon reverse rotation, so that armature 26 can move in a counterclockwise direction as seen in FIG. 4 without corresponding movement of the shaft. The second armature assembly 27 is constructed the same as armature 26, and also serves through a series of spring-pressed clutch rollers to drive the shaft in a clockwise direction, but not a counterclockwise direction.

The stationary pole assembly 31 of the motor may include a permanent magnet 40, typically formed of ferrite, and two laminated pole assemblies 41 and 42 coacting with the two armatures 26 and 27 respectively. The permanent magnet 40 is magnetized reversely with respect to the two armatures, as indicated in FIG. 3, having the north pole of the permanent magnet at one of its sides within armature 26 and at its opposite side within the other armature 27. As seen in FIG. 4, each of the laminated pole assemblies 41 or 42 includes two upstanding arms 43 and 44, at opposite sides of the permanent magnet 40, and interconnected at their lower ends as indicated at 45, with a suitable coil 46 extending about both of the pole assemblies acting to provide flux through those assemblies and the corresponding armatures. By reason of the reversal in effective direction of the permanent magnet insofar as the two armatures are concerned, current in a particular direction through coil 46 produces a polarity in the associated armature and its laminated pole assembly which is additive to the permanent magnet polarity, while the electrically produced polarity in the second armature and its laminated pole assembly is subtractive with respect to the permanent magnet, so that the same electrical current will cause motion of one of the armatures in a rightward direction while the other armature moves in a leftward direction, and vice versa. Coil 46 is energized by alternating current from the AC power source 24 of FIG. 5, to oscillate the two armatures oppositely, with the result that on a first half cycle of the current, one of the armatures moves in a clockwise direction in FIG. 4, and drives shaft 18 in that direction, while the other armature moves in the reverse direction, or counterclockwise, and does not drive the shaft. On the next half cycle of the current, the second of the armatures has a driving stroke, in a clockwise direction, while the previously driving armature moves oppositely in a left-hand nondriving direction. Thus, the shaft is rotated in step-by-step fashion, with one step for each half cycle of the alternating current. Springs 46 may bear against the two arms of each armature to yieldably resist motion of the armature, and allow adjustment of the armature motion to attain any desired rotary angular movement of the output shaft 18 on each half cycle of the energizing current.

A prior art showing of certain typical step-by-step motors which may be utilized as the motor 23 of the present invention, and which are basically very similar to the particular structure described above, may be found in U.S. Pat. No. 3,351,789 issued Nov. 7, 1967 to R. J. Bertling.

Referring now to FIG. 5, coil 17 of the recording head 16 is desirably energized by alternating current from the same source 24 which drives the motor 22. One side of the power source may be connected at 47 to a center tap on recording head coil 17, while the other side of the power source may be connected by a line 48 through two silicon-controlled rectifiers 49 and 50 to the opposite ends respectively of the center-tapped coil. The two rectifiers 49 and 50 will thus pass current through their respective halves of the coil only when the current is flowing in one direction, as for instance during the upper or positive half-cycle 51 of the alternating current wave represented at 52 in FIG. 6. During the lower or negative half 53 of each cycle of the alternating current wave in FIG. 6, the rectifiers both prevent passage of any current through coil 17, to thus prevent recording of any data signal on the tape during those half cycles. Input information is supplied to the control terminals of the silicon-controlled rectifiers 49 and 50 through two input lines 54 and 55 connected into the FIG. 5 circuit as shown. When a signal is supplied to line 54, typically representing a binary one, this signal actuates rectifier 49 to a condition in which, during the half cycle in which rectifier 49 is otherwise conductive, current passes through the left-hand portion of coil 17 in FIG. 5, to induce magnetic flux in a predetermined direction within head 16, for recording a predetermined one-indicating magnetic level on tape 15, as indicated at 56 in FIG. 6. When a zero-indicating signal is supplied through the second input line 55 to rectifier 50, that rectifier is permitted to become conductive during the next half cycle in which current is flowing in the proper direction to pass through the rectifier, and as a result current flows through the right-hand portion of coil 17, in the opposite direction, to record a reverse negative level on the tape, as indicated at 57 in FIG. 6. The data signals on lines 54 and 55 may be supplied by any suitable information source 58, typically taking the form of a conventional parallel entry to serial output shift register. This element may consist of a sequence of bistable toggles 59 whose initial setting may be determined by the arbitrary arrangement of a like numbered sequence of switches set manually or by the sensing of holes in a punched card. Upon the closure of switch 56 the initially presented configuration of the above sequence of switches is frozen into the shift register. Thereafter each positive going excursion of potential on line 48 with reference to ground will be interpreted as a clock pulse by appropriate peak-detecting circuitry. The first two such clock pulses may typically be disregarded to provide spacing on the tape for the data words, and thereafter each such clock pulse will gate out on either line 54 or 55 (through a gate 60 or 61) a signal corresponding to the state of the toggle in the least significant or output position, and then downshift all the data in the toggles one step to present the next more significant datum in the output toggle. This operation may be continued until all the data has been presented, passed out and recorded at which time the switch 56 may be opened. The end of this operation may be determined by counting the number of output pulses on a separate counter to reach a terminal number.

To now describe the overall operation of the recording equipment illustrated in the drawings, assume that a tape cartridge 14 has been inserted into the FIG. 1 position, and that binary information is being supplied to data input lines 54 and 55 in the manner discussed above from information source 58. To record this information, the operator actuates a control switch 56, to simultaneously supply alternating current from source 24 to motor 23 and the recording head circuit. Motor 23 acts in the discussed manner to advance the tape through a predetermined distance, as represented at *d* in FIG. 6, on each half cycle of the alternating current. On the first positive or upper half cycle as seen in the upper curve of FIG. 6, head 16 functions to record on tape 15 a binary one or a binary zero, depending on whether line 54 or 55 of FIG. 5 is energized. If a binary one is recorded, this appears on the tape as magnetization of the corresponding interval of the tape in a predetermined direction, say in a positive direction as represented in the lower curve of FIG. 6, while a zero is represented as magnetization in the opposite or negative direction. During the next half cycle, as indicated at 53 in FIG. 6, the current is flowing in a direction which cannot pass through either of the rectifiers 49 or 50, and therefore the tape is given a region of zero magnetization at this point, as indicated at 57 in the lower curve of FIG. 6. On the next upper half cycle, the next successive data bit is recorded, and on the next lower half cycle another interval of zero magnetization is produced, etc., so long as information is supplied by source 58. When all of the data available at a particular time has been recorded, switch 56 is opened to stop the recording operation, until additional data is available for recording. Thus, a series of intermittent recording intervals can produce a continuous recorded square-wave pattern of the type indicated in the lower curve of FIG. 6, typically in the form of a "return-to-zero" (RZ) code pattern, or may of course produce other code patterns by appropriate alteration of the circuitry.

While a certain specific embodiment of the present invention has been disclosed as typical, the invention is of course not limited to this particular form, but rather is applicable broadly to all such variations as fall within the scope of the appended claims.

I claim:

1. Apparatus comprising recording head means for recording a series of data bits successively on a record track, means for advancing said track progressively past said head means and including a motor driven by alternating current and operable to advance the track through a first step on each positive half cycle of the alternating current and through a second step on each negative half cycle of the alternating current, and means for actuating said head means to record data bits on the track on one of said half cycles of the alternating current but not on the other half cycle.

2. Apparatus as recited in claim 1, in which said last-mentioned means include rectifier means for passing to said recording head means only said one half cycle of said alternating current and not said other half cycle, and additional regulating means for passing or not passing said one half cycle to said recording head means in accordance with input data signals supplied to said additional means.

3. Apparatus as recited in claim 1, in which said last-mentioned means include two silicon-controlled rectifiers for passing to said recording head means only said one half cycle of the alternating current and not said other half cycle, and means for actuating said rectifiers respectively to pass said one half cycle to said head means in accordance with data input signals supplied thereto.

4. Apparatus as recited in claim 1, in which said motor includes a rotary output element for driving said track, vibratory armature means electromagnetically actuable by said alternating current and which reverse direction of motion on each reversal of direction of said alternating current, and clutch means for driving said rotary element from said armature means in successive unidirectional rotary steps on successive actuations of said armature means.

5. Apparatus as recited in claim 1, in which said motor includes a rotary output element for driving said track, two vibratory armatures electromagnetically vibrated oppositely by said alternating current and each reversing its direction of motion on each reversal of direction of said alternating current, and two clutches for driving said rotary element from said two armatures alternately and each in one rotary direction but not the reverse direction.

* * * * *